(12) United States Patent
Ito (10) Patent No.: US 7,614,693 B2
(45) Date of Patent: Nov. 10, 2009

(54) SEATING AREA ADJUSTER

(75) Inventor: Sadao Ito, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 90 days.

(21) Appl. No.: 11/585,878

(22) Filed: Oct. 25, 2006

(65) Prior Publication Data

US 2007/0090673 A1 Apr. 26, 2007

(30) Foreign Application Priority Data

Oct. 26, 2005 (JP) .............................. 2005-311778

(51) Int. Cl.
*B60N 2/02* (2006.01)
(52) U.S. Cl. .................. 297/284.11; 297/311
(58) Field of Classification Search ................ 297/16.1, 297/51, 53, 54, 452.63, 284.11, 311, 312, 297/313
See application file for complete search history.

(56) References Cited

U.S. PATENT DOCUMENTS

| | | | | |
|---|---|---|---|---|
| 2,942,647 A | * | 6/1960 | Pickles | 248/394 |
| 4,334,709 A | * | 6/1982 | Akiyama et al. | 297/284.11 |
| 4,629,248 A | * | 12/1986 | Mawbey | 297/284.11 |
| 4,652,049 A | * | 3/1987 | Maruyama et al. | 297/284.11 |
| 5,528,959 A | * | 6/1996 | Yamakami | 74/665 GD |
| 5,542,744 A | * | 8/1996 | Bathrick | 297/362.11 |
| 5,572,933 A | * | 11/1996 | Thompson | 108/7 |
| 5,647,635 A | * | 7/1997 | Aumond et al. | 297/284.11 |
| 5,738,327 A | * | 4/1998 | Tanaka et al. | 248/419 |
| 6,260,922 B1 | * | 7/2001 | Frohnhaus et al. | 297/330 |
| 6,419,317 B1 | * | 7/2002 | Westrich et al. | 297/284.11 |
| 6,454,353 B1 | * | 9/2002 | Knaus | 297/284.11 |
| 7,404,602 B2 | | 7/2008 | Okada et al. | |
| 2002/0113473 A1 | * | 8/2002 | Knaus | 297/284.11 |
| 2007/0132286 A1 | * | 6/2007 | Taoka et al. | 297/216.1 |

FOREIGN PATENT DOCUMENTS

| | | |
|---|---|---|
| DE | 41 04 440 | 10/1991 |
| JP | 6-284940 | 10/1994 |
| JP | 7-13244 | 3/1995 |
| JP | 7-77567 | 8/1995 |
| JP | 2004-155341 | 6/2004 |

* cited by examiner

*Primary Examiner*—Sarah B McPartlin
(74) *Attorney, Agent, or Firm*—Finnegan, Henderson, Farabow, Garrett & Dunner, LLP (57) ABSTRACT

A seating area adjuster for a seat of a vehicle includes a seating member having a seating surface, a support portion supporting the seating member, an adjustment mechanism connected with the seating member and supported by the support portion to be movable in an adjustment direction in which a length of the seating surface is adjusted and rotatable about a shaft extending perpendicular to the adjustment direction and to an up and down direction of the adjustment mechanism, a movement mechanism moving the adjustment mechanism in the adjustment direction relative to the support portion, and a rotation control mechanism controlling the adjustment mechanism to a predetermined rotational position corresponding an amount of a movement of the adjustment mechanism in the adjustment direction.

23 Claims, 6 Drawing Sheets

SEATING AREA ADJUSTER

This application is based on and claims priority under 35 U.S.C. § 119 to Japanese Patent Application 2005-311778, filed on Oct. 26, 2005, the entire content of which is incorporated herein by reference.

FIELD OF THE INVENTION

The present invention relates to a seating area adjusting apparatus.

BACKGROUND

Conventionally, a seating area adjuster is known which adjusts a length of a seating surface of a seat cushion so that a user can be seated in a comfortable posture corresponding to his/her size. Such apparatus is placed in the seat cushion and is provided with a roller at a tip portion. By means of a movement of the roller in a back and forth direction, a tip portion of the seat cushion is protruded forward and retracted backward and the length of the seating surface in the back and forth direction can thereby be adjusted.

Generally, the seating surface of the seat cushion is made of leather, fabric, or the like, which is hardly retractable. The cushion member made of resin foam, or the like, is arranged at a backside of a skin member for a buffer effect. In order to avoid a generation of wrinkle because of a looseness of the hardly retractable skin member and to avoid an application of an excessive tensile force relative to the seating member in a condition where the length of the seating surface in the back and forth direction is changed, a spring for applying an appropriate tensile force to the seat skin member is provided.

According to a seating area adjuster disclosed in JP06-284940A, the spring for applying the tensile force to the skin member is engaged with an end of the skin member at a first end and is engaged with a support frame at a second end. Therefore, when the roller moves forward for lengthening the seating surface, the skin member is applied with an increased spring force at the tip end portion of the seat cushion. On this occasion, the cushion member is more compressed than it was before an adjustment of the seating member. Thus, the cushion member becomes harder and the buffer effect of the cushion member may occasionally be reduced. The tip end portion of the seat cushion is in contact with femoral region of the user which is sensitive in comfortable ride. Therefore, an appropriate buffer effect of the seat cushion is required to be maintained for realizing a comfortable sense of use. In order to make up for decrease in the buffer effect of the cushion member, a spring having a low spring constant may be applied for restricting an increase in the tensile force. However, the spring size may be increased and the manufacturing cost and the weight of the adjuster may be increased.

According to a seating area adjuster disclosed in JPU07-013244, an end of the spring is engaged with a lever which is rotated in response to an adjusting operation of the seating surface. Therefore, an increase in spring force can be eased. However, it is difficult to equalize a movement amount of the roller with a movement amount of the lever. Thus, the increase in the spring force may not be prevented in a condition where the length of the seating area is adjusted. Further, the cushion member may be superfluously compressed. With the configuration of the seating area adjuster disclosed in JPU07-013244, the spring is also required as well as the seating area adjuster disclosed in JP06-284940A.

A need thus exists to realize a seating area adjuster having a low-cost structure which maintains an invariable buffer effect of the cushion member at any adjusted position of the seating surface without using the spring for applying the tensile force to the skin member.

SUMMARY OF THE INVENTION

According to an aspect of the present invention, a seating area adjuster for a seat of a vehicle includes a seating member having a seating surface, a support portion supporting the seating member, an adjustment mechanism connected with the seating member and supported by the support portion to be movable in an adjustment direction in which a length of the seating surface is adjusted and rotatable about a shaft extending perpendicular to the adjustment direction and to an up and down direction of the adjustment mechanism, a movement mechanism moving the adjustment mechanism in the adjustment direction relative to the support portion, and a rotation control mechanism controlling the adjustment mechanism to a predetermined rotational position corresponding an amount of a movement of the adjustment mechanism in the adjustment direction.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A first embodiment of a seating area adjuster 7 (see FIG. 2, hereinafter, referred to as an adjuster 7) of a seat according to the present invention will be explained hereinbelow with reference to FIGS. 1-6.

Figure 1:
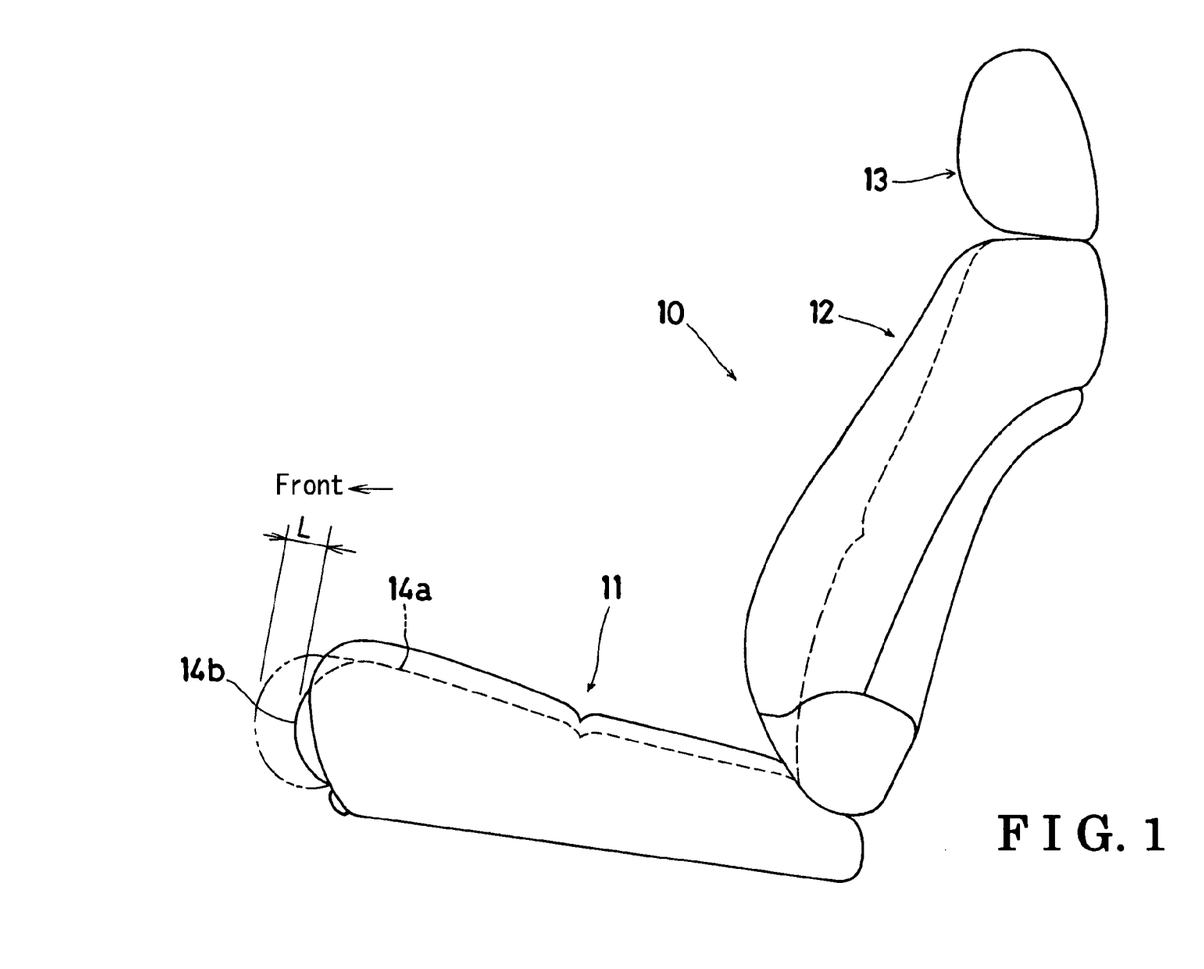
FIG. 1 is a side view illustrating a seat provided with a seating area adjuster according to embodiments of the present invention.

As illustrated in FIG. 1, a seat 10 mainly includes a seat cushion 11, a seatback 12, and a headrest 13. The adjuster 7 according to the present invention includes a basic configuration applicable to any one of the seat cushion 11, the seatback 12, and the headrest 13. However, an example of the adjuster 7 applied to the seat cushion 11 will be given in the following explanation.

The configuration of the adjuster 7 applied to the seat cushion 11 is illustrated in FIGS. 1-5. The seat cushion 11 includes a seating member 14 which comes in contact with a user at a seating surface 14a. The adjuster 7 includes the configuration of adjusting a position of an end portion 14b of the seating surface 14a at any location between a fully retracted position indicated by a solid line and an L-length fully expanded position indicated by a chain double-dashed line.

The configuration of the adjuster 7 will be explained in detail with reference to FIGS. 2-5.

Figure 2:
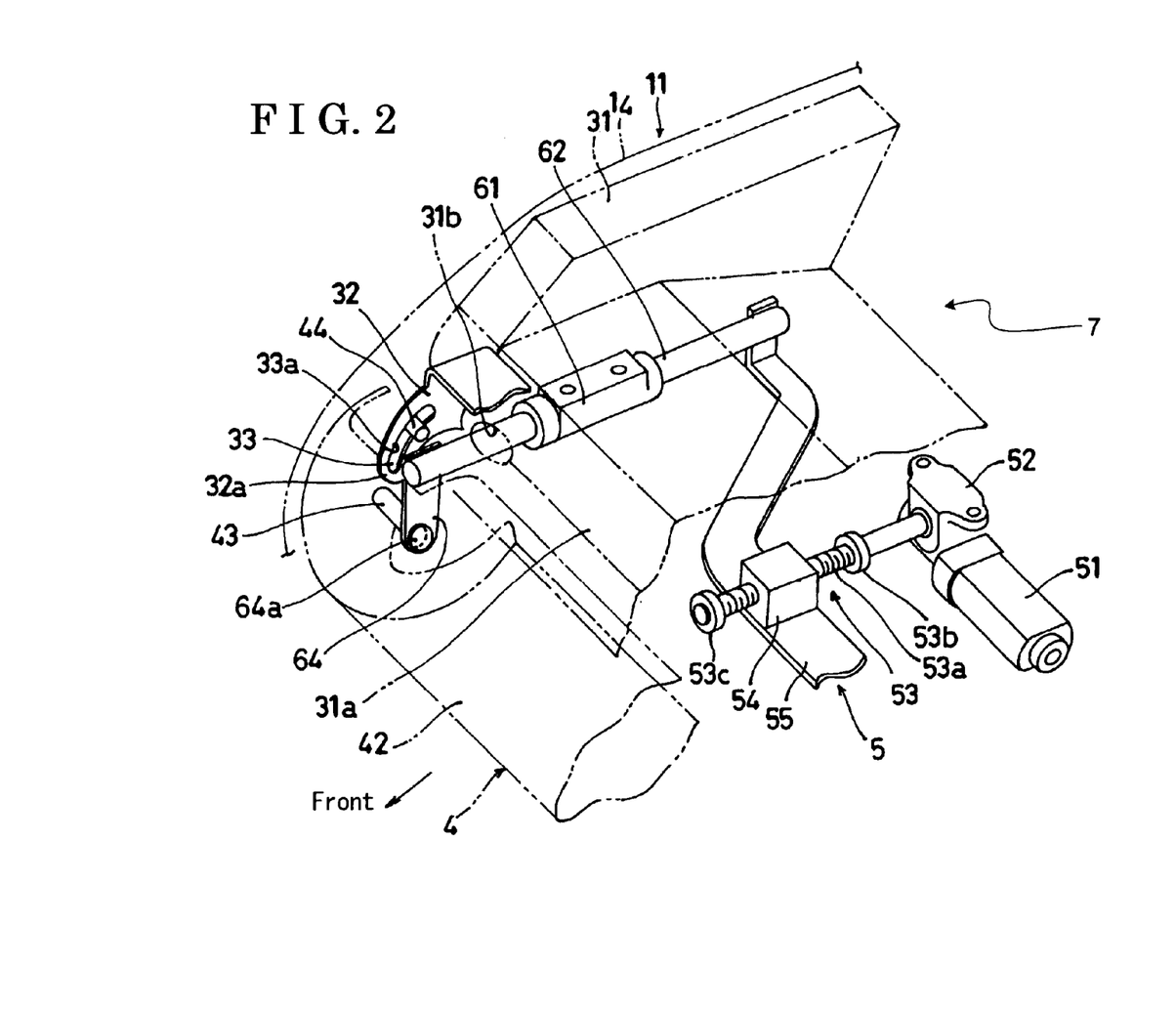
FIG. 2 is a perspective view illustrating a mechanism of a seating area adjuster according to a first embodiment of the present invention.

The adjuster 7 is placed at an interior of the seat cushion 11. Although FIG. 2 illustrates only a right hand part of the adjuster 7, the adjuster 7 has a symmetric structure.

The adjuster 7 includes a movement mechanism 5. A speed reduction gear device 52 of the movement mechanism 5 is fixed at a lower surface of a cushion frame 31 (support portion) serving as a frame member of the seat cushion 11. A motor 51 is supported at the speed reduction gear device 52. A screw 53, which rotates in response to an operation of the motor 51, is extended forward from the speed reduction gear device 52. The screw 53 includes a screw portion 53a. The screw 53 is fixed on an arm 55 extending in a width direction of the seat 10 at the screw portion 53a and is screwed with a nut 54 having a female screw (not shown). Only a right hand part of the movement mechanism 5 is illustrated in FIG. 2 and a left hand part of the movement mechanism 5 is not illustrated. However, the movement mechanism 5 has a symmetric structure.

A rod 62 is fixed at an end portion of the arm 55 and is extended forward. A front end portion of the rod 62 is further extended forward through a hole 31b provided at a front wall portion 31a of the cushion frame 31. The rod 62 is slidably supported at a guide 61 attached to the cushion frame 31 at a center portion. An arm 64 is fixed at a front end of the rod 62 and is extended downward.

In response to a rotational operation of the motor 51, the nut 54 is moved by means of the screw 53 and the rod 62 is thereby moved in a back and forth direction. A moving range of the rod 62 is defined by a distance between stoppers 53b and 53c attached both ends of the screw portion 53a of the screw 53.

A guide bracket 32 is fixed on a front surface of the front wall portion 31a of the cushion frame 31. The guide bracket 32 includes a flat surface portion 32a extending in a substantial up and down direction. A guide hole 33 formed at the flat surface portion 32a is curved and extended in a substantial up and down direction. The guide hole 33 includes a guide surface 33a having a certain width.

Figure 3:
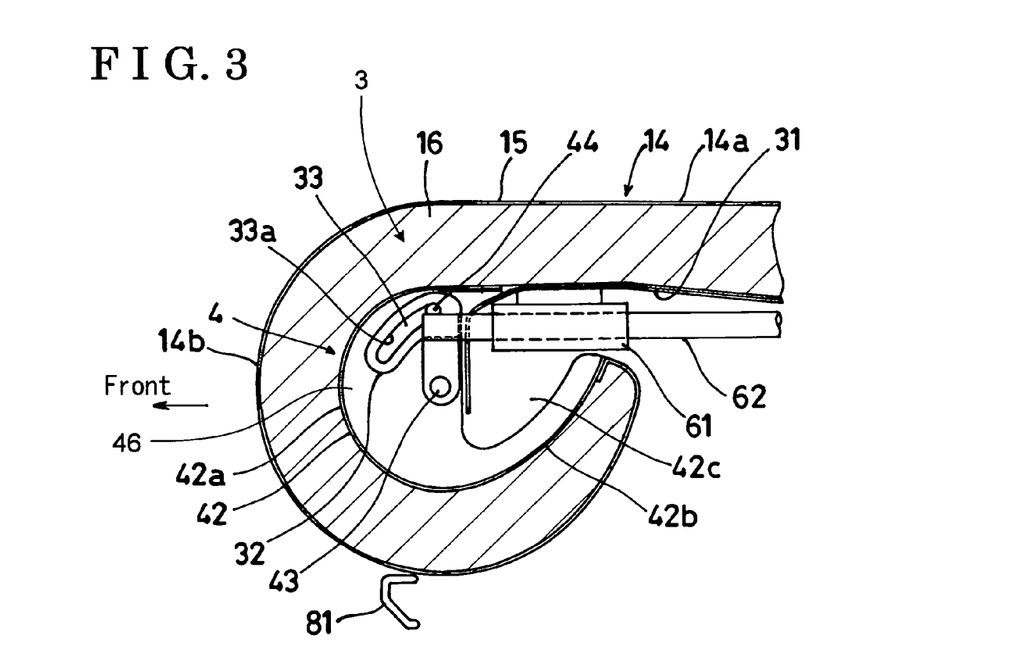
FIG. 3 is a sectional view illustrating a tip end portion of a seat cushion in a condition where a length of a seating surface is set at a shortest position by means of the seating area adjuster according to the first embodiment of the present invention.
Figure 4:
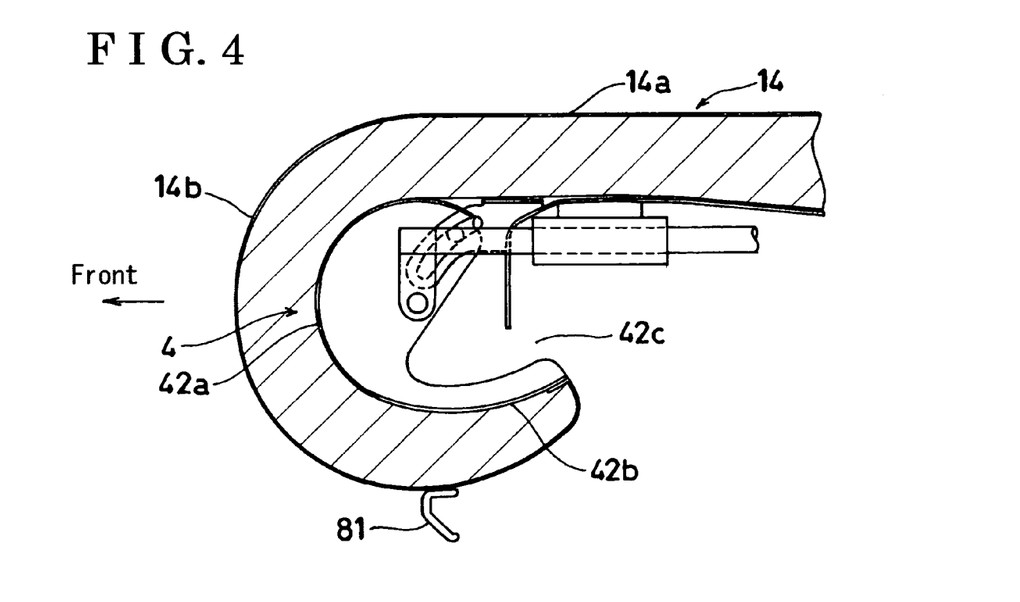
FIG. 4 is a sectional view illustrating the tip end portion of the seat cushion in a condition where the length of the seating surface is set at an intermediate position by means of the seating area adjuster according to the first embodiment of the present invention.
Figure 5:
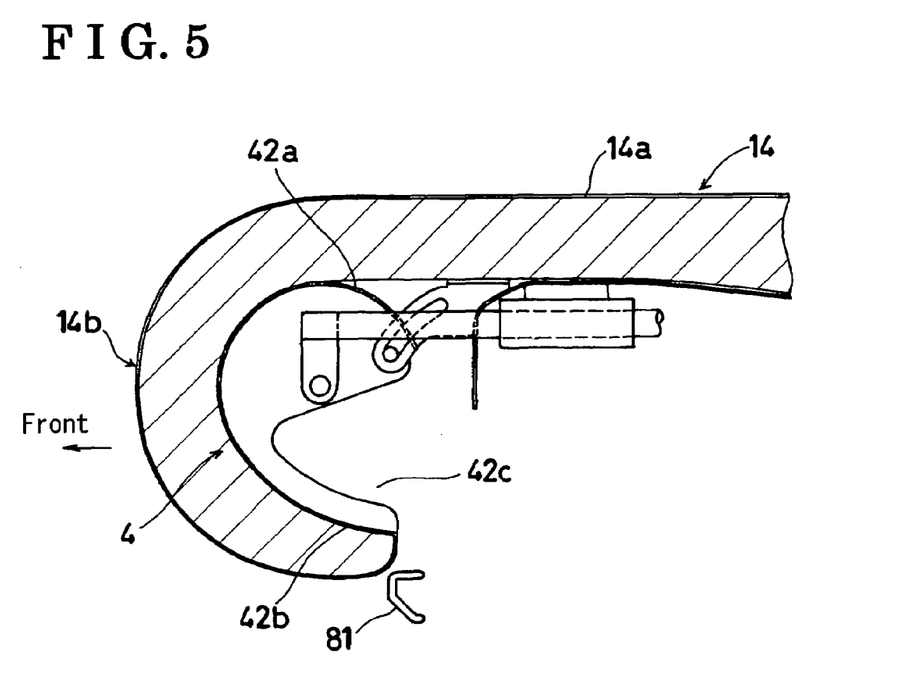
FIG. 5 is a sectional view illustrating the tip end portion of the seat cushion in a condition where the length of the seating surface is set at a longest position by means of the seating area adjuster according to the first embodiment of the present invention.

A drum 4 (i.e., an adjustment mechanism) is arranged in front of the front wall portion 31a of the cushion frame 31. The drum 4 includes a drum surface portion 42 along the front wall portion 31a, a drum surface portion 42 including substantially a same length with the front wall portion 31a in a horizontal direction of the seat 10. A cross-section of the drum surface portion 42 in the up and down direction includes a C-shape as illustrated in FIGS. 3-5. More specifically, the drum surface portion 42 includes a circular arc portion 42a, an extension portion 42b, and an opening portion 42c.

The drum 4 includes end walls 46 integrally attached at both ends of the drum 4 in the horizontal direction. Each end wall 46 is placed at outside of the arm 64 of the rod 62 in the horizontal direction. A rotation shaft 43 horizontally extending toward the arm 64 is fixed on the end wall 46 at a center of the circular arc portion 42a. The rotation shaft 43 is rotatably fitted to a shaft hole 64a formed on the arm 64. Accordingly, the drum 4 becomes movable with the rod 62 in the back and forth direction relative to the cushion frame 31 and becomes rotatable about the rotation shaft 43.

A rotation of the drum 4 is controlled by means of a rotation control mechanism 3 so that a rotational position of the drum 4 corresponds to an adjustment length of the seating surface 14a. The rotation control mechanism 3 includes a guide hole 33 and a guide pin (i.e., a guide shaft) 44 attached to the end wall 46 of the drum 4. The guide pin 44 is provided parallel to the rotation shaft 43 and is placed apart from the rotation shaft 43. More specifically, the guide pin 44 and the guide hole 33 are engaged with each other by leaving a minimum space therebetween, a minimum space allowing a smooth sliding of the guide pin 44 at the guide surface 33a. The rotation of the drum 4 is restricted by the guide pin 44 and the guide hole 33. Illustrated in FIG. 3 is a condition in which the rotation shaft 43 is placed at the vicinity of the cushion frame 31. Illustrated in FIG. 5 is a condition in which the rotation shaft 43 is placed away from the cushion frame 31. Illustrated in FIG. 4 is a condition in which the rotation shaft 43 is placed at an intermediate position between positions illustrated in FIGS. 3 and 5. When the rotation shaft 43 moves forward from the condition illustrated in FIG. 3 to the condition illustrated in FIG. 5, the drum 4 moves forward and rotates in a clockwise direction.

The seating member 14 of the seat cushion 11 includes an skin member 15 and a cushion member 16. The skin member 15 offers the seating surface 14a which can be in contact with the user. The cushion member 16 is arranged at a lower side of the skin member 15. The skin member 15 is made of leather, heavy duty fabric, or the like, and is relatively hard to expand and contract. On the other hand, the cushion member 16 includes an elasticity-rich buffer so that the user is transmitted with little vibration and the user is not applied with a localized pressure. The skin member 15 and the cushion member 16 can be bonded. However, the present invention is not limited thereto. Alternatively, or in addition, the skin member 15 and the cushion member 16 may not be bonded.

A rear end portion and a side end portion of the skin member 15 and a rear end portion and a side end portion of the cushion member 16 are attached to the cushion frame 31 by means of a clip (not shown), or the like. According to the embodiment of the present invention, a front end portion of the skin member 15 and a front end portion of the cushion member 16 are bonded to the extension portion 42b of the drum surface portion 42 in such a manner that the skin member 15 covers the cushion member 16 as illustrated in FIGS. 3-5. However, the present invention is not limited thereto. The present invention is applicable as long as the skin member 15 and the cushion member 16 are fixed to the extension portion 42b. In the condition illustrated in FIGS. 4 and 5, the circular arc portion 42a of the drum surface portion 42 is released from a contact with the cushion member 16 in response to a movement and the rotation of the drum 4. According to the embodiment of the present invention, the skin member 15 and the cushion member 16 are not bonded to the circular arc portion 42a and are able to roll out.

A shape of the extension portion 42b of the drum surface portion 42 is defined so that a large space may not be generated between the skin member 15 and a cover 81 even when the drum 4 is moved or rotated. Accordingly, an appearance of the seat 10 is maintained. Further, a specified mechanism of the rotational position of the drum 4 by the guide pin 44 and the guide hole 33 will be explained in detail with reference to FIG. 6.

Figure 6:
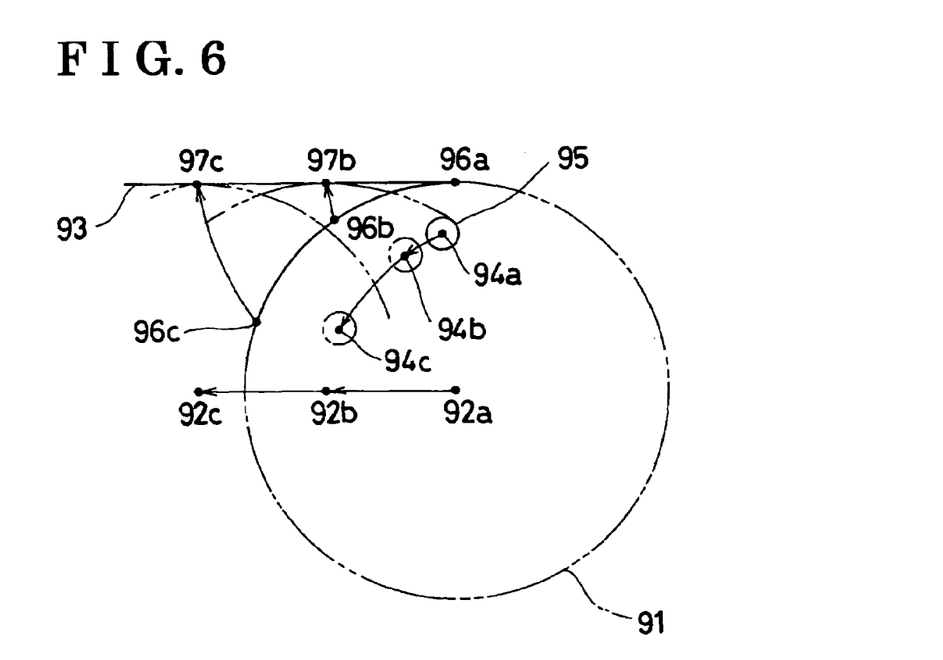
FIG. 6 is a view for explaining a trochoidal curve adapted to a guide hole of the seating area adjuster according to the first embodiment of the present invention.

Illustrated in FIG. 6 is a condition in which a disk 91 rotates on a flat surface 93. A pin 95 is fixed to the disk 91. In response to a rotation of the disk 91, a center of the disk 91 moves from a point 92a to a point 92c through a point 92b and a center of the pin 95 moves from a point 94a to a point 94c through a point 94b. A locus of the center of the pin 95 passing through the points 94a, 94b, and 94c is known as a trochoidal curve. On this occasion, points 96a, 96b, and 96c placed on a periphery of the disk 91 respectively come in contact with points 96a, 97b, and 97c placed on the flat surface 93. Accordingly, a travel distance from the point 92a to the point 92c is same as a travel distance from the point 96a to the point 97c.

A guide hole 33 of the adjuster 7 according to the embodiment of the present invention includes the trochoid curve. Therefore, when the drum 4 moves back and forth, the drum 4 is rotated by a predetermined angle so that the drum 4 can roll up the seating member 14 corresponding an amount of the movement of the drum 4 and can roll out the seating member 14 corresponding an amount of the movement of the drum 4. Accordingly, a tensile force applied to any adjusted position of the seating surface 14 can be maintained virtually constant.

According to the embodiment of the present invention, the guide hole 33 includes the trochoid curve. However, the present invention is not limited thereto. In an actual design, the guide hole 33 may include an appropriate curve or a straight line as long as the tensile force applied to the seating member 14 is within an accepted range.

An operation of the adjuster 7 of the seat 10 according to the first embodiment of the present invention will be explained hereinbelow.

When the user of the seat 10 is changed to a taller person and more space in the seating surface 14a in the back and forth direction is required, the user operates an operation button (not shown) of the adjuster 7. In response to the operation, the motor 51 starts a rotational operation and the drum 4 moves forward through the movement mechanism 5. When the drum 4 moves forward, the seating member 14 rolled up by the drum 4 is rolled out corresponding to an amount of the movement of the drum 4. The operation is terminated when a desired space in the seating surface 14a is realized. During the adjustment operation, the tensile force of the seating member 14 is maintained at a value which offers a comfortable ride without causing a wrinkle on the skin member 15 or harming a buffer effect because of an excessive pressure on the cushion member 16. The operation of the adjuster 7 for reducing the space in the seating surface 14a is performed by reversely operating the motor 51. Also in this case, as is obvious from the configuration, the tensile force of the seating member 14 is maintained at a value which offers the comfortable ride.

Figure 7:
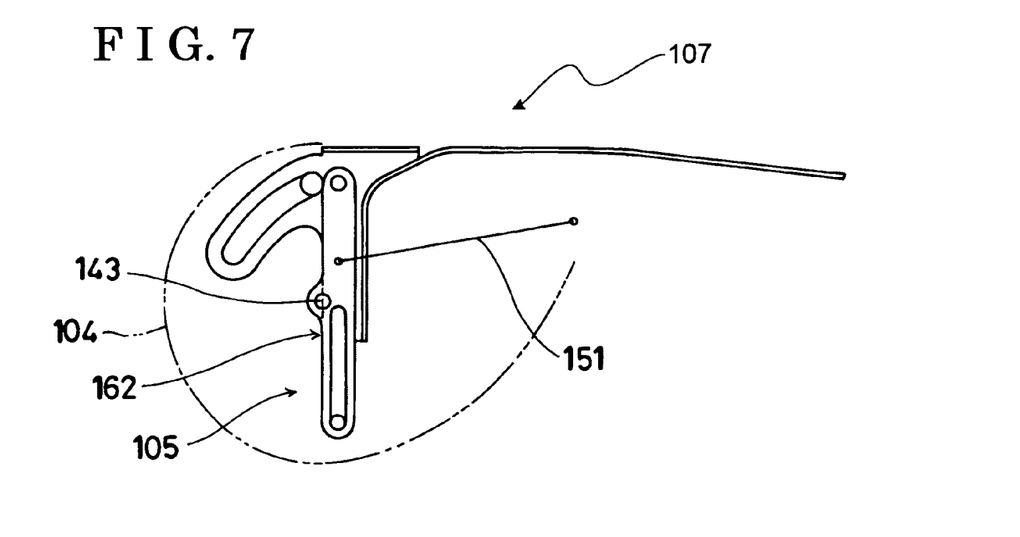
FIG. 7 is a sectional view illustrating a condition where a length of a seating surface is set at a shortest position by means of a link mechanism applied to a seating area adjuster according to a second embodiment of the present invention.
Figure 8:
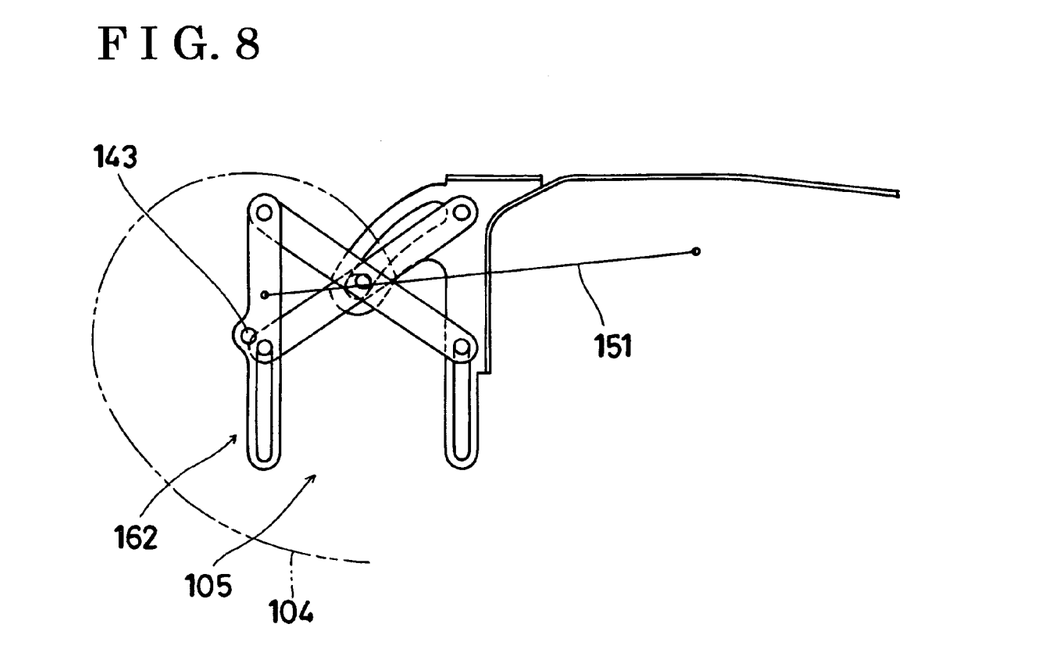
FIG. 8 is a sectional view illustrating a condition where the length of the seating surface is set at a longest position by means of the link mechanism applied to the seating area adjuster according to the second embodiment of the present invention.

A second embodiment of the present invention will be explained hereinafter. An adjuster 107 according to the second embodiment of the present invention is illustrated in FIGS. 7 and 8. The same structure as described in the aforementioned embodiment is not repeatedly explained. A link mechanism 162 is used as a movement mechanism 105. The link mechanism 162 is called "X link" in a mechanistic field and is configured of four link elements. The link mechanism 162 is activated by means of an operation of an expansion and contraction device unit 151. More specifically, the link mechanism 162 supports a rotation shaft 143 of a drum 104 and moves the rotation shaft 143 in the back and forth direction as well as the rod 62 of the first embodiment of the present invention. The link mechanism is not limited to the X link. The present invention is applicable as long as the link mechanism moves the rotation shaft 143 in the back and forth direction. By use of a high quality finished link mechanism which is conventionally used for the seat, the movement mechanism 105 can be realized which is smoothly operated and is superior in durability.

For example, a combination of the motor 1, the screw 53, and the nut 54 of the first embodiment of the present invention can be applied to the configuration of the expansion and contraction device unit 151. According to the second embodiment of the present invention, the link mechanism 162 can be housed in the drum 104. Therefore, the adjuster 107 can be downsized.

Figure 9:
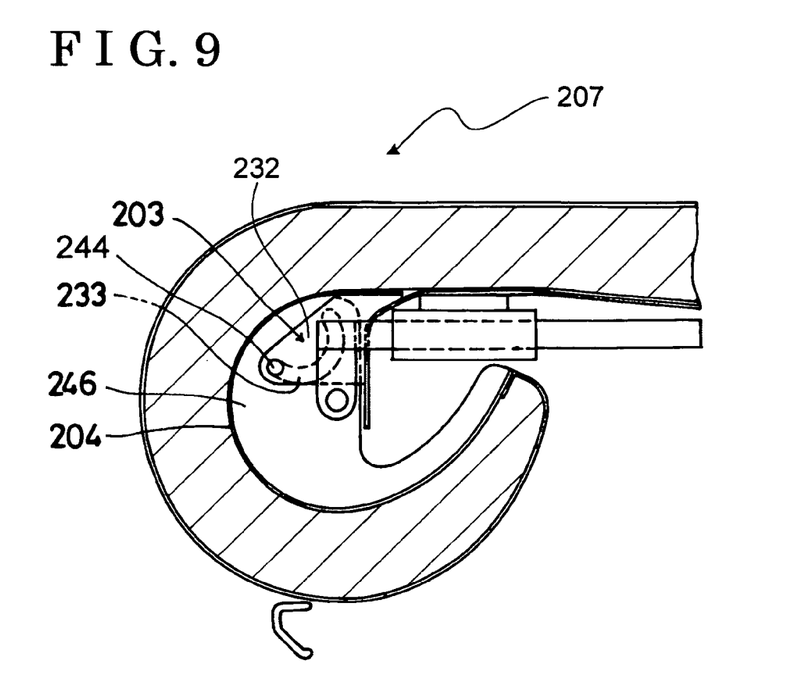
FIG. 9 is a sectional view illustrating a condition where a length of a seating surface is set at a shortest position by means of an adjustment mechanism applied to a seating area adjuster according to a third embodiment of the present invention.
Figure 10:
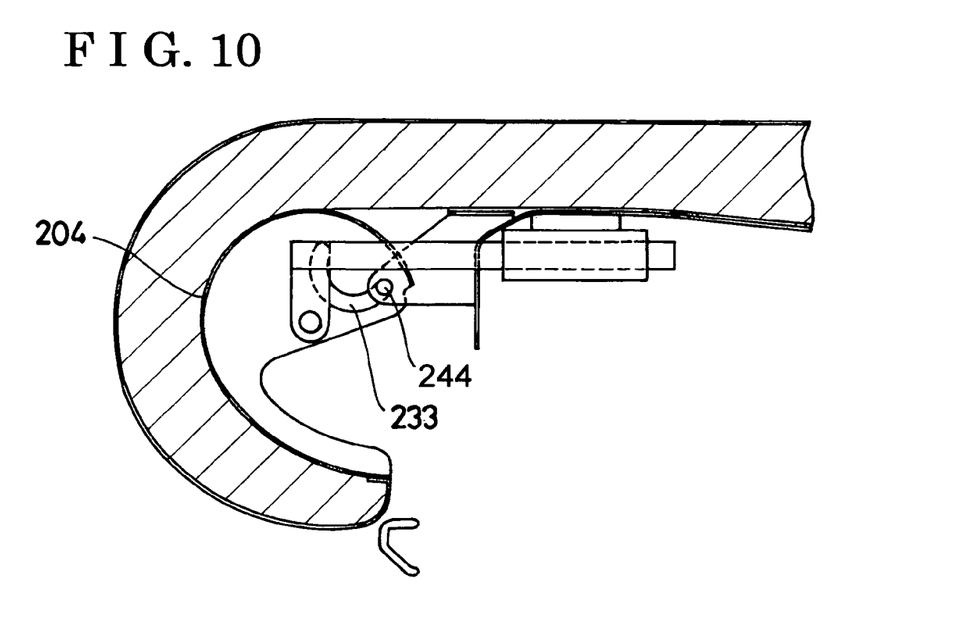
FIG. 10 is a sectional view illustrating a condition where a length of the seating surface is set at a longest position by means of the adjustment mechanism applied to the seating area adjuster according to the third embodiment of the present invention.

A third embodiment of the present invention will be explained hereinafter. An adjuster 207 according to the third embodiment of the present invention is illustrated in FIGS. 9 and 10. The same structure as described in the aforementioned embodiments is not repeatedly explained.

An arrangement of the guide hole and the guide pin of the third embodiment of the present invention is reversed relative to an arrangement of the guide hole 33 and the guide pin 44 of the first embodiment of the present invention. More specifically, a guide hole 233 is formed at an end wall 246 of a drum 204 and a guide pin 244 is fixed to a guide bracket 232. By appropriately arranging the guide hole 233 and the guide pin 244, a rotation control mechanism 203 of the third embodiment of the present invention can perform an operation similar to the rotation control mechanism 3 of the first embodiment of the present invention.

According to the embodiments of the present invention, the seating member is rolled up and rolled out for changing the seating area by means of the rotation of the drum by a predetermined angle corresponding to an amount of the movement of the adjustment mechanism. Therefore, the seating member can normally be applied with a predetermined tensile force without using the spring. Further, the adjuster of the present invention can offer the comfortable ride at any adjusted seating area and the manufacturing cost of the adjuster can be reduced.

According to the embodiments of the present invention, the seating member is directly fixed to the adjustment mechanism and the support portion without providing a biasing member such as the spring for applying the tensile force to the seating member (the skin member and the cushion member). Therefore, the adjuster, according to the embodiments of the present invention, realizes a simple and robust structure.

According to the embodiments of the present invention, the rotation control mechanism includes a simple structure such as a combination of the guide hole and the guide shaft. Therefore, the manufacturing cost and a size of the adjuster can be reduced.

According to the embodiments of the present invention, the guide hole of the rotation control mechanism includes the trochoidal curve. Therefore, the seating surface can be rolled out and rolled up corresponding to an amount of the movement of the adjustment mechanism (a roller). Accordingly, the seating member can be applied with the specific tensile force at any adjusted seating area.

According to the embodiment of the present invention, the link mechanism is applied to the movement mechanism. Therefore, the adjuster of the present invention can realize a smooth operation.

According to the embodiment of the present invention, the seating member is rolled up on a smooth surface of the circular arc portion of the adjustment mechanism. Therefore, an application of a localized unreasonable load relative to the seating member can be prevented. Accordingly, durability of the seat can be improved.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seating area adjuster for a seat of a vehicle, comprising:
   a seating member having a seating surface;
   a support portion supporting the seating member;
   an adjustment mechanism connected with the seating member and supported by the support portion, the adjustment mechanism including a circular arc portion, an extension portion, an opening portion, and an end wall being disposed within the opening portion and in contact with the circular arc portion and configured to be movable in an adjustment direction in which a length of the seating surface is adjusted and a guide bracket fixed on the seating member and having a flat surface portion extending in a substantially vertical direction, the adjustment mechanism rotating the seating member about a rotation shaft extending perpendicular to the adjustment direction of the adjustment mechanism and being supported at the end wall;
   a movement mechanism configured to move the end wall of the adjustment mechanism in the adjustment direction relative to the support portion, the movement mechanism including an elongated rod slidably supported at the support portion, an arm being fixed at a front side of the rod and extending in a downward direction, the arm rotatably supporting the rotation shaft at an under side of the arm;
   a motor, a screw rotating in response to an operation of the motor, an operation arm fixed at the screw being connected to the rod; and
   a rotation control mechanism controlling the end wall of the adjustment mechanism to a predetermined rotational position corresponding to an amount of a movement of the end wall of the adjustment mechanism in the adjustment direction with a rotation center on the rotation shaft;
   wherein the rotation control mechanism includes a guide shaft attached to the end wall, provided parallel to the rotation shaft, and placed apart from the rotation shaft, and a guide hole formed at the flat surface portion of the guide bracket, the guide shaft being slidably engaged with the guide hole.

2. The seating area adjuster for a seat of a vehicle according to claim 1, wherein a first end of the seating member is directly engaged with the adjustment mechanism and a second end of the seating member is directly engaged with the support portion.

3. The seating area adjuster for a seat of a vehicle according to claim 1, wherein the circular arc portion is configured to roll up the seating member in response to a rotation of the adjustment mechanism.

4. The seating area adjuster for a seat of a vehicle according to claim 3, wherein a cross-section of the adjustment mechanism in the substantially vertical direction forms a C-shape.

5. The seating area adjuster for a seat of a vehicle according to claim 1, wherein the guide hole includes a trochoidal curve.

6. The seating area adjuster for a seat of a vehicle according to claim 1, wherein the movement mechanism includes a speed reduction gear device fixed at the support portion, and wherein the motor is supported at the speed reduction gear device.

7. The seating area adjuster for a seat of a vehicle according to claim 6, wherein the screw includes a screw portion, the screw is fixed on the operation arm at the screw portion and is held with a nut.

8. The seating area adjuster for a seat of a vehicle according to claim 7, wherein the nut is moved by means of the screw and the rod is thereby moved in a back and forth direction, a moving range of the rod being defined by a distance between stoppers attached to both ends of a threshold portion of the screw.

9. The seating area adjuster for a seat of a vehicle according to claim 1, wherein a cross-section of the adjustment mechanism in the substantially vertical direction forms a C-shape.

10. The seating area adjuster for a seat of a vehicle according to the claim 1, wherein the adjustment mechanism includes a pair of end walls attached at both ends of the adjustment mechanism in a horizontal direction, each end wall placed outside of the arm of the rod in the horizontal direction, and the rotation shaft extending horizontally toward the arm, the arm being fixed on the end wall at a center of the circular arc portion and rotatably fitted to a shaft hole formed at the under side of the arm.

11. The seating area adjuster for a seat of a vehicle according to claim 1, wherein the screw is rotatable about an axis defining an axial direction, the screw is linked to a first end of the operation arm which is disposed generally transverse to the axial direction, a second end of the operation arm is linked to the rod to move the rod in the axial direction in response to operation of the motor, and the axial direction is parallel to the adjustment direction.

12. A seating area adjuster for a seat of a vehicle, comprising:
   a seating member having a seating surface;
   a support portion supporting the seating member;
   an adjustment mechanism connected with the seating member and supported by the support portion, the adjustment mechanism including a circular arc portion, an extension portion, an opening portion, and an end wall being disposed within the opening portion and in contact with the circular arc portion and the extension portion, the end wall being configured to be movable in an adjustment direction, wherein a length of the seating surface is adjusted and a guide bracket is fixed on the seating member, and having a flat surface portion extending in a substantially vertical direction, the adjustment mechanism rotating the seating member about a rotation shaft extending perpendicular to the adjustment direction of the adjustment mechanism and being supported at the end wall;

a movement mechanism configured to move the end wall of the adjustment mechanism in the adjustment direction relative to the support portion, the movement mechanism including a link mechanism comprising a plurality of link elements and being activated by means of an operation of an expansion and contraction device unit;

a motor, a screw rotating in response to an operation of the motor; and a rotation control mechanism controlling the end wall of the adjustment mechanism to a predetermined rotational position corresponding to an amount of a movement of the end wall of the adjustment mechanism in the adjustment direction with a rotation center on the rotation shaft;

wherein the rotation control mechanism includes a guide shaft attached to the flat surface portion of the guide bracket, provided parallel to the rotation shaft, and placed apart from the rotation shaft, and a guide hole formed at the end wall, the guide shaft being slidably engaged with the guide hole.

13. The seating area adjuster for a seat of a vehicle according to claim 12, wherein the expansion and contraction device unit includes a speed reduction gear device being fixed at the support portion, the motor being supported at the speed reduction gear device.

14. The seating area adjuster for a seat of a vehicle according to claim 12, wherein a cross-section of the adjustment mechanism in the substantially vertical direction forms a C-shape.

15. The seating area adjuster for a seat of a vehicle according to claim 12, wherein the adjustment mechanism includes a pair of end walls attached at both ends of the adjustment mechanism in the horizontal direction, each end wall placed outside of the link mechanism in the horizontal direction, the rotation shaft being fixed on the end wall at a center of the circular arc portion and rotatably fitted to a shaft hole formed at the link mechanism.

16. The seating area adjuster for a seat of a vehicle according to claim 12, wherein the screw is rotatable about an axis defining an axial direction, the screw is linked to a first end of an operation arm which is disposed generally transverse to the axial direction, a second end of the operation arm is coupled to at least one of the link elements to move the at least one of the link elements in the axial direction in response to operation of the motor, and the axial direction is parallel to the adjustment direction.

17. A seating area adjuster for a seat of a vehicle, comprising:

a seating member having a seating surface;

a support portion supporting the seating member;

an adjustment mechanism connected with the seating member and supported by the support portion, the adjustment mechanism including a circular arc portion, an extension portion, an opening portion, and an end wall being disposed within the opening portion and in contact with the circular arc portion and the extension portion, the end wall being configured to be movable in an adjustment direction in which a length of the seating surface is adjusted, and a guide bracket fixed on the seating member and having a flat surface portion extending in a substantially vertical direction, the adjustment mechanism rotating the seating member about a rotation shaft extending perpendicular to the adjustment direction of the adjustment mechanism and being supported at the end wall;

a movement mechanism configured to move the end wall of the adjustment mechanism in the adjustment direction relative to the support portion, the movement mechanism including an elongated rod and slidably supported at the support portion, and an arm fixed at a front side of the rod and supporting the rotation shaft;

a motor, a screw rotating in response to an operation of the motor, and an operation arm fixed at the screw being connected to the rod; and a rotation control mechanism controlling the end wall of the adjustment mechanism to a predetermined rotational position corresponding to an amount of a movement of the end wall of the adjustment mechanism in the adjustment direction with a rotation center on the rotation shaft;

wherein the rotation control mechanism includes a guide shaft attached to the flat surface portion of the guide bracket, provided parallel to the rotation shaft, and placed apart from the rotation shaft, and a guide hole formed at the end wall, the guide shaft being slidably engaged with the guide hole.

18. The seating area adjuster for a seat of a vehicle according to claim 17, wherein a first end of the seating member is directly engaged with the adjustment mechanism and a second end of the seating member is directly engaged with the support portion.

19. The seating area adjuster for a seat of a vehicle according to claim 17, wherein the guide hole includes a trochoidal curve.

20. The seating area adjuster for a seat of a vehicle according to claim 17, wherein the movement mechanism includes a speed reduction gear device fixed at the support portion, wherein the motor is supported at the speed reduction gear device.

21. The seating area adjuster for a seat of a vehicle according to claim 20, wherein the screw includes a screw portion, the screw being fixed on the operation arm at the screw portion and being held with a nut.

22. The seating area adjuster for a seat of a vehicle according to claim 21, wherein the nut is moved by means of the screw and the rod is thereby moved in a back and forth direction, a moving range of the red is defined by a distance between stoppers attached to both ends of a threshold portion of the screw.

23. The seating area adjuster for a seat of a vehicle according to claim 17, wherein the screw is rotatable about an axis defining an axial direction, the screw is linked to a first end of the operation arm which is disposed generally transverse to the axial direction, a second end of the operation arm is linked to the rod to move the rod in the axial direction in response to operation of the motor, and the axial direction is parallel to the adjustment direction.

* * * * *